United States Patent [19]

Bollmann

[11] Patent Number: 4,589,557

[45] Date of Patent: May 20, 1986

[54] MOUNTING MEANS FOR (RELEASABLY AND MOVABLY) MOUNTING DEVICES ON A WALL, PARTICULARLY IN CLINICS, FIRST AID OR SURGERY ROOMS, AND THE LIKE; AND MANUFACTURING METHOD FOR SAID MOUNTING MEANS

[76] Inventor: Armin A. Bollmann, Rosenstrasse 10, Friedrichsthal, Saarland, Fed. Rep. of Germany, 6605

[21] Appl. No.: 627,910

[22] Filed: Jul. 3, 1984

[30] Foreign Application Priority Data

Jul. 9, 1983 [DE] Fed. Rep. of Germany ....... 3324849

[51] Int. Cl.⁴ ................................................ A47F 5/08
[52] U.S. Cl. .......................................... 211/94; 52/36; 211/87; 248/225.1
[58] Field of Search .................. 211/94, 94.5, 57, 162, 211/47, 189; 52/36, 284; 248/220.2, 225.1, 220.3

[56] References Cited

U.S. PATENT DOCUMENTS

| | | | |
|---|---|---|---|
| 3,119,154 | 1/1964 | Moore | 52/284 |
| 3,352,428 | 11/1967 | Sak et al. | 211/87 |
| 4,420,087 | 12/1983 | Johns | 211/189 |
| 4,434,900 | 3/1984 | Cook | 211/189 |

*Primary Examiner*—Robert W. Gibson, Jr.
*Attorney, Agent, or Firm*—Holman & Stern

[57] ABSTRACT

A mounting wall for mounting measurement, test, and medical treatment devices on a room wall, particularly in clinics, hospitals, first aid rooms, surgery rooms, and the like, is comprised of flat slate elements of magnetizable material for mounting lightweight devices furnished with a magnetic mounting fixture, and generally trapezoidal profiled rails which extend in an intersecting crossing array between the plate elements, the rails having interior trapezoidal shaped channels for mounting heavy deremovably which are furnished with supporting fixtures adapted to fit the trapezoidal shape of the channels.

4 Claims, 5 Drawing Figures

4,589,557

MOUNTING MEANS FOR (RELEASABLY AND MOVABLY) MOUNTING DEVICES ON A WALL, PARTICULARLY IN CLINICS, FIRST AID OR SURGERY ROOMS, AND THE LIKE; AND MANUFACTURING METHOD FOR SAID MOUNTING MEANS

BACKGROUND OF THE INVENTION

1. Field of the Invention

The invention relates to apparatus for mounting devices on a wall by means of at least two parallel rails to which the devices are releasably attached, and more particularly for mounting measuring, testing, and medical treatment devices in clinics, hospitals, first aid rooms, surgery rooms and the like.

2. Description of the Prior Art

Such mounting means are known for use in all kinds of laboratories, for attaching measurement, test, and (in the medical area) treatment devices of various sizes and weights to room walls, in such facilities as intensive care units, first aid or surgery rooms, emergency room, dialysis rooms, ambulances, and the like. Known mounting means of this type are comprised of a number of parallel horizontal mounting rails to which the devices are clamped by means of appropriate support fixtures. The devices may be easily displaced horizontally but vertical displacement may be achieved only by shifting them between rails. This limitation is particularly inconvenient in the case of lightweight devices, such as blood pressure measurement devices, waste-bag containers, instrument tables, spray bottle dispensers, or the like, which it may be desirable to move quickly and often.

BRIEF SUMMARY OF THE INVENTION

The object of the invention is to improve upon a device of the known type, so as to be able to move devices and even heavy devices (e.g., function monitors, respirators, infusion pumps, etc.) to arbitrary horizontal and vertical positions on the wall, and further so as to be able to move lightweight devices easily and without manipulating any type of clamping screw.

This object is achieved according to the invention by means of the features of an array of mutually crossing, channel-shaped rails with channels of generally trapezoidal cross-section which enables the support fixtures having clamping members which are adjusted so as to fit the trapezoidal channel shape to be easily inserted into the open narrow sides of the profiled rails, rotated, and clamped in the interior of a horizontal or vertical rail by tightening a clamping screw, such clamping being available at any position on the breadth and height of the said array. In the invention an adequate clamping member is comprised of a type of hook which may be easily introduced into the crossing points of the open narrow sides of the profiled rails, in which crossing points the diagonal dimension of the opening is greater than the width of the rail opening. In combination with smooth plates comprised of a magnetizable material, the invention provides a mounting wall on which lightweight devices bearing a magnetic mounting fixture may be easily "stuck on" at any given position on the array.

The mutually crossing, profiled rails also enable movable mountings for large and heavy devices to be affixed to the mounting wall, which mountings replace the wheeled carriages formerly required, which roll the device on the floor, with the advantage that there is more footroom and space in general made available, in that in particular the heavy equipment may be moved over against the wall when not needed.

In the area of application concerned with clinics and the like, it is well known that hygiene requirements are particularly high. Accordingly, the invention provides that the trapezoidal profiled rails are connected to the smooth magnetizable plates in gap-free fashion. If the mounting wall attached to the wall of the room is furnished with a surrounding cover strip on its perimeter, which strip extends to the room wall, disinfectant may be sprayed on the entire mounting wall from an easily accessible spraying position, i.e., with no disassembly. Contaminants may not penetrate into the room from the space behind the mounting wall.

BRIEF DESCRIPTION OF THE DRAWINGS

An embodiment of a gap-free mounting wall in accordance with the invention and method of manufacture thereof will be described hereinbelow with reference to the accompanying drawings wherein.

DETAILED DESCRIPTION

Figure 1:
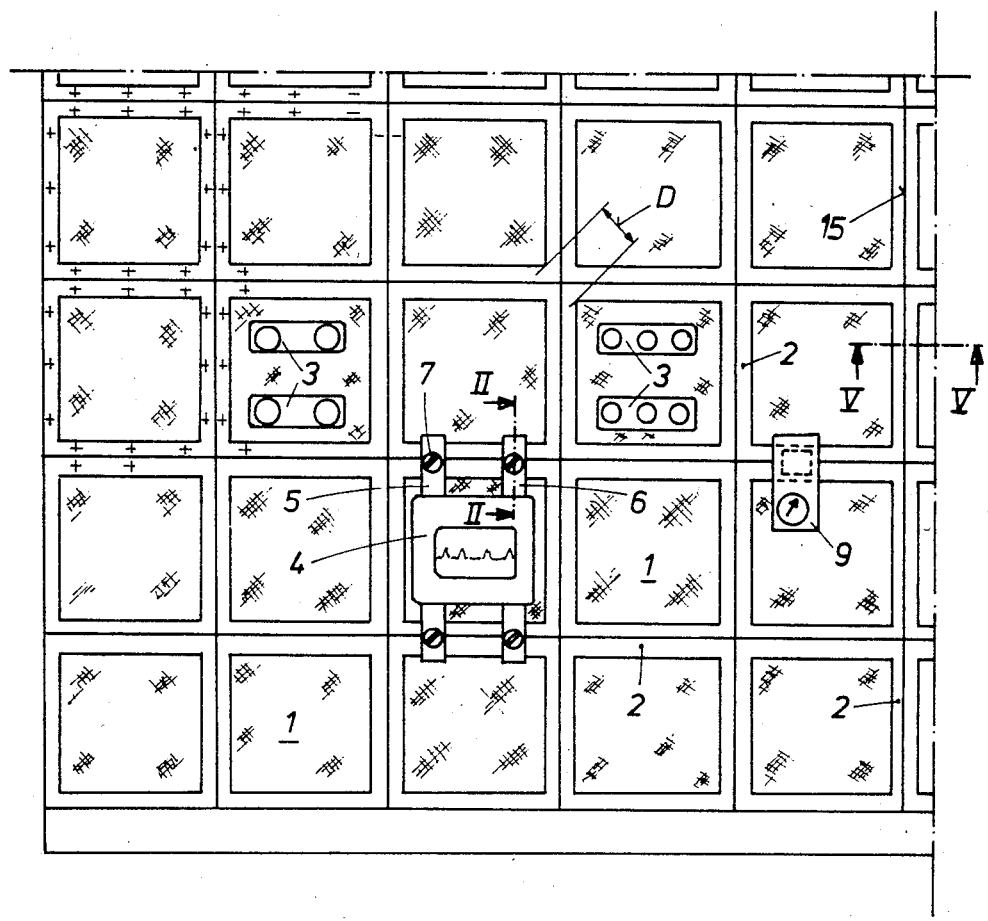
FIG. 1 is a front elevational view of an installed mounting wall according to the invention with a few devices mounted thereon.
Figure 2:
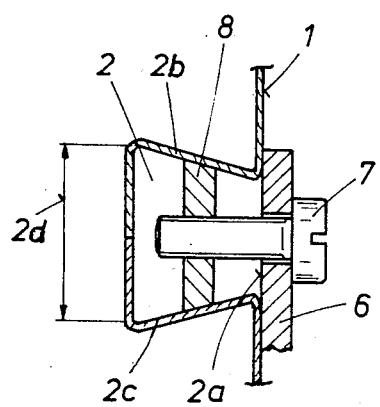
FIG. 2 is an enlarged cross-sectional view taken along line II—II of FIG. 1.
Figure 5:
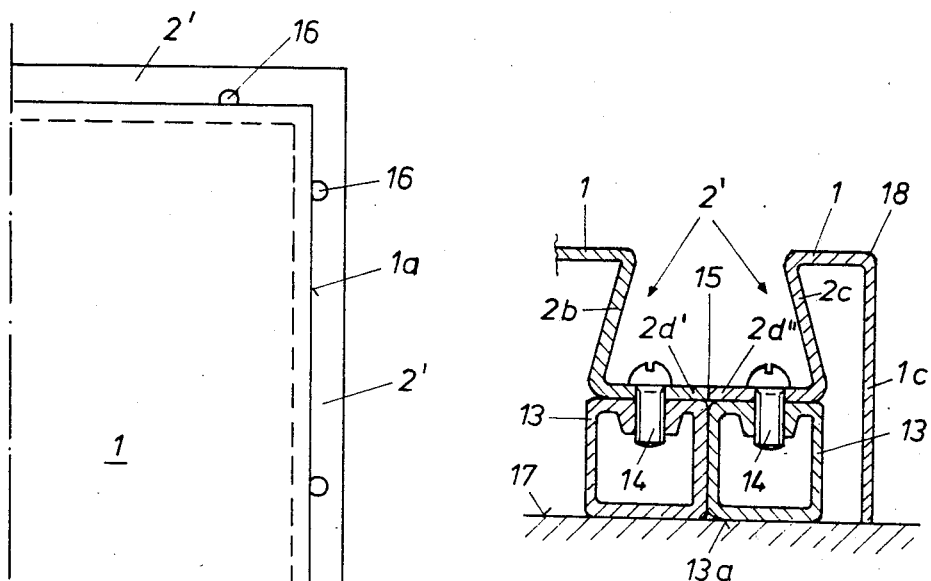
FIG. 5 is an enlarged cross-sectional view taken along line V—V of FIG. 1, showing the supporting construction.

FIG. 1 shows a mounting wall with a checkerboard array comprised of square plates 1 of a magnetizable material, between which plates there extend horizontal and vertical, channel-shaped profiled rails 2 which mutually intersect. These rails 2 are generally trapezoidal in cross section (FIGS. 2 and 5). The narrow sides 2a of the trapezoids, which face the operator, are open.

In the exemplary embodiment illustrated, the inclined sides 2b and 2c of the trapezoid, along with half of the long base 2d of the trapezoid, are integral with the respective adjoining plates 1, and are produced by bending operations described below.

A few devices are attached to the mounting wall of FIG. 1, such as may be required in the intensive care unit of a hospital. Some containers are similar lightweight devices 3 are attached to various plates 1 by magnetic mounting fixtures (not shown) and can be easily displaced to other positions. The mounting of heavy devices will be described using the example of a function monitor 4. Two vertical flat bars 5 and 6 are attached to the rear wall of the monitor 4, which bars extend over two superjacent horizontal profiled rails 2. As seen from FIG. 2, the ends of the bars 5 and 6 bear clamping screws 7 onto which the clamping members 8 are screwed, which clamping members fit the trapezoidal shape of the profiled rails 2. The width of the clamping members is less than the open narrow sides 2a of the rails 2, so that in a specific orientation they may be inserted into the trapezoidal rails 2 and may then be brought into the clamping position of FIG. 2 after being rotated 90°. In the clamping position they clamp the bars 5 and 6 and thereby the device 4, via tightening of the screws 7. By loosening the screws 7, the device 4 may be easily displaced sideways. In the same manner, the vertically extending profiled rails 2 may be employed for clamping the devices.

Lighter weight devices such as blood pressure measurement devices 9 need not necessarily be clamped. The trapezoidal shape of the profiled rails permits simple hanging of the device by means of a hooklike mounting fixture. Such a fixture may be easily introduced through the intersection region of the rails 2, where the diagonal dimension D is greater than the width of the opening of the narrow sides 2a of a rail.

Figure 4:
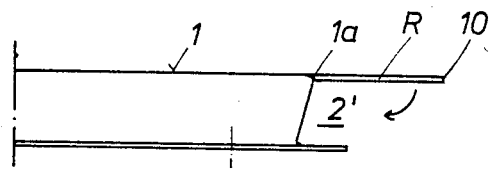
FIG. 4 is a top edge view of FIG. 3.
Figure 3:
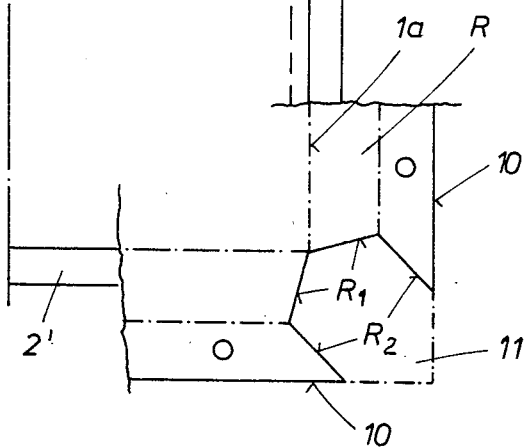
FIG. 3 is a partial front elevational view of a plate element with half of a profiled rail formed in it, and showing a detail in the region of a corner.

FIGS. 3 and 4 illustrate a side region of a rectangular plate element 1 with a half of a profiled rail 2' formed in its border and extending around its perimeter. An enlarged cross-sectional view of these halves of profiled rails is illustrated in FIG. 5, which shows a combination of two such half rails 2' to form a channel with a complete trapezoidal profile.

The following procedure is employed to manufacture a rectangular plate element with half of a profiled rail 2' formed in its border. The starting workpiece is a metal sheet with a border region extending to the edges 10, which region is to be formed into the half rail. A hexagon 11 was punched out from each corner of the sheet, resulting in to four distinct border strips R. Then in a first bending step these border strips R are bent perpendicularly to the surface of sheet 1, around edge 1a, and in a second step they are bent into the angular configuration shown in FIG. 4, which configuration corresponds to the half 2' of a bilaterally symmetrical profiled rail. The cut edges $R_1$ and $R_2$ produced by the hexagonal punching 11 are in such a relation to each other that after the ending operations these edges will mutually abut to form a single inclined intersection edge, i.e., along a diagonal line at the corner, whereupon they may be joined by welding or the like, so as to be gap-free. In this way a symmetrical half rail 2' of a trapezoidal profiled rail 2 is formed around the perimeter of each sheet 1. The thus formed plate elements 1, 2' are fastened to a support structure via the free legs 2d' and 2d" of the half rails 2' in such a way that the adjoining profiled rail halves 2' are combined to form the trapezoidal shape of the profiled rails 2.

In order to mount the plate elements 1, 2' on the masonry wall 17, which may be masonry, two square cross-section girders are employed in the exemplary embodiment shown in FIG. 5, which girders are bolted or screwed together (fastenings not shown). The two mutually flush half base-sides 2d' and 2d" of the profiled channel are bolted or screwed with bolts or screws 14 to the respective square girders 13, wherewith the junction ends 15 mutually abut. The flat alignment of these half base-sides on the square girders produces a gap-free seal at the junction ends 15. Obviously, the support surfaces on the square girders 13 may also be coated with a sealant. The holes 16 for inserting the bolts or screws 14 are shown in FIG. 3. To attach the girders 13 to the wall 17, holes are provided which run through the girders between the bolts or screws 14. These holes are larger than the heads of the fastening bolts or screws 14, and accommodate attachment means for attaching to the wall the sides 13a of the girders 13 which lie against the wall.

As indicated by the section line V—V in FIG. 1, FIG. 5 is a cross section through profiled rail 2 disposed on the edge of the mounting wall structure. Here the exterior part of the sheet 1 is bent 90° about an edge 18 so that a region 1c of the sheet is disposed with its free edge flush with the wall-side support surface of the girders 13. The bentover region 1c provides a covering strip of the side of the structure, which strip extends to the wall 17 where it can be sealed in gap-free fashion. In this way the support structure of the mounting wall according to the invention is encapsulated with respect to the room, so that the corresponding plate elements 1, 2' can be sprayed hygienically clean.

The exemplary embodiment illustrated in design for use in the clinical area of application. It is understood that the measures devised to meet the stringent hygienic requirements of that environment are not needed if the mounting wall structure is employed in a technical laboratory or a workshop. Under such conditions it may be feasible and expedient to furnish the mounting wall with an undercarriage so as to be movable from place to place on the workplace floor.

I claim:

1. Mounting means adapted to be attached to a wall for releasably mounting devices therein comprising:
   a plurality of first parallel channel-shaped profiled rails having a generally trapezoidal cross-section;
   a plurality of second parallel profiled rails having the same channel-shaped trapezoidal cross-section as said first rails extending perpendicularly to and intersecting with said first rails to form an array of mutually crossing rails and channels;
   each rail having one of the parallel sides shorter than the other with the shorter side being open and facing away from the wall on which the mounting means is attached to form an entry slot for each channel in each rail into which support fixtures for devices are removably insertable; and
   rectangular plate elements of magnetizable material disposed between and connected to said profile rails adjacent said shorter sides.

2. Mounting means as claimed in claim 1 wherein:
   said plate elements are joined along their edges to said rails in continuous gap-free manner to form an array of parallel spaced intersecting channels having open entry slots substantially in the planes of said plate elements.

3. Mounting means as claimed in claim 2 wherein said plate elements lie in the same plane.

4. A method of manufacturing the mounting means claimed in claim 3 comprising:
   providing a plurality of rectangular plate members;
   punching out a hexagonal piece at each corner of each plate member to form new corners;
   bending the edge portions of each plate member along a straight line connecting the new corners perpendicularly to the plane of said plate member;
   bending said edge portions further to a predetermined angle with respect to the plane of the plate member;
   bending an outer region of said edges outwardly and toward the plane of the plate member into a position parallel with said plane of the plate member so that the remaining edges of the hexagonal punched out corners are in mutually and respective abutting relationship;
   welding said abutting edges together to form a gap-free joint therebetween to form a symmetrical profiled half rail, of generally trapezoidal cross-section profiled rail, around the perimeter of each plate member;
   assembling a plurality of said plate members in an array with their edges in abutting relationship, except the outer edges of the outermost plate members; and
   attaching said edges to a support structure.

* * * * *